Patented Feb. 25, 1930

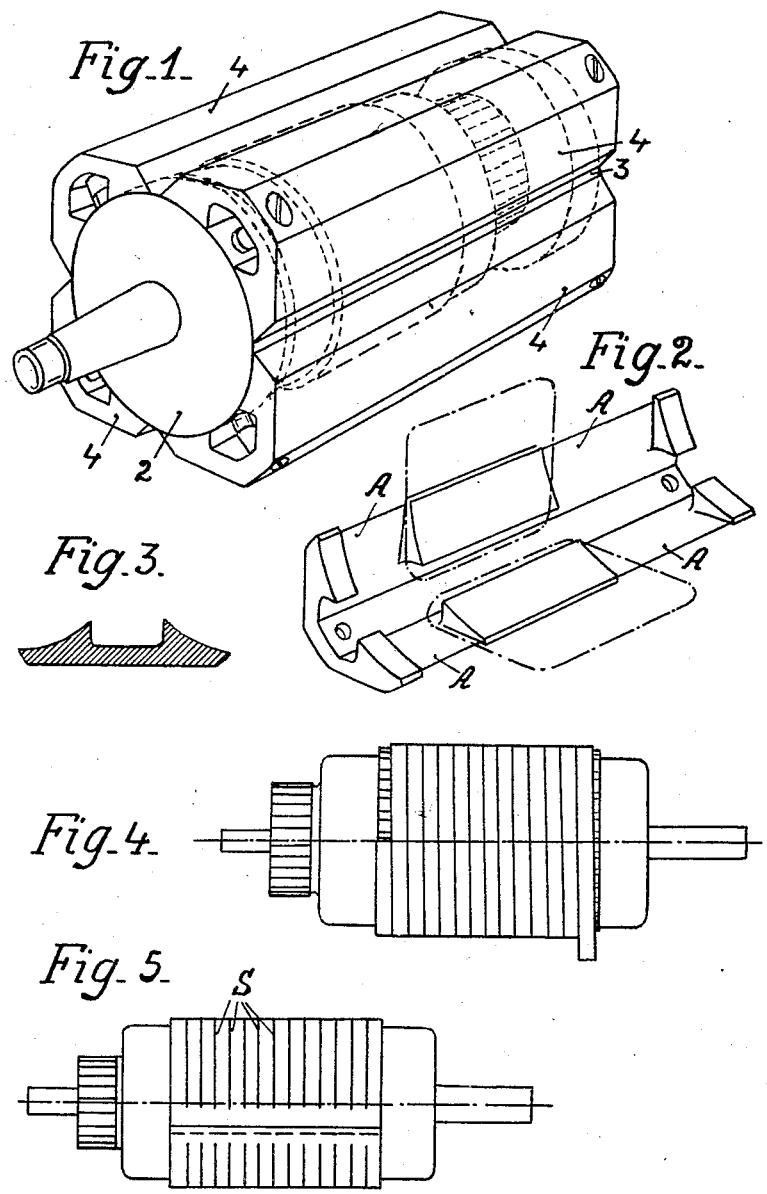
Feb. 25, 1930. H. PAPST 1,748,242
ELECTRIC STARTING AND LIGHTING MACHINE
Filed May 25, 1926
Inventor
Hermann Papst
by Ernest D. Jansen
Atty.

1,748,242

UNITED STATES PATENT OFFICE

HERMANN PAPST, OF VIENNA, AUSTRIA, ASSIGNOR, BY MESNE ASSIGNMENTS, TO FRANCIS B. KEANE, OF BRIDGEPORT, CONNECTICUT

ELECTRIC STARTING AND LIGHTING MACHINE

Application filed May 25, 1926, Serial No. 111,585, and in Austria February 28, 1925.

My invention relates to improvements in electric starting and lighting machines for automobiles and aeroplanes. The usual starting motors are in the course of a day only a minute or two in service and then operate with very large overloads in comparison with standard electromotors. The efficiency is therefore comparatively low owing to the copper losses increasing with the square of the current. The weight of the machine amounts to about 15 to 30 kgs. and during the drive this is quite a useless load. The improved starting motor according to my invention is about 40% lighter for the same output and its efficiency is about 20% better.

The starting motor which I have constructed in accordance with my invention, comprises a special form of split pole motor. The magnet frame of the motor is composed of a plurality of individual split field poles secured at each end of the machine and bearing shields. Since, as is well known, the field poles are split, the ever present armature reactions will be less than with solid poles, because of the interposition of the pole gaps. The main air gap between armature and field may therefore be made smaller, since it is not then necessary to provide a high reluctance in the path of the armature field, and since the main air gap can be made smaller, a smaller field winding can be used. The result will be that the motor employing features such as I propose can be made considerably smaller and lighter and yet an efficient motor produced. The weak field winding has therefore also a low resistance which shows itself particularly favorably in the efficiency in case of overloads. Owing to the weak field coils the magnet frame is so small that the machine with an equal armature becomes lighter by about 40%.

Lighting machines and combined lighting and starting machines may with equal advantage, be furnished with a split pole magnet frame in conjunction with the arrangements described hereafter in order to reduce the weight and increase the efficiency. The self-excitation capacity even of split pole machines constructed entirely of sheet iron is remarkable. Split pole machines can, furthermore, operate more easily with a powerful armature current in a weak field whereby the voltage regulation extends to a larger speed range. The idea underlying the construction of the machine is the following: The pole pieces rest upon and are fixed to the bearing shields so that they leave a narrow throughout equal air gap for the armature without any machining. The manufacture becomes furthermore extremely simple and cheap inasmuch as owing to this arrangement of the pole pieces rolled or forged section iron may be employed which need be finished at the ends only.

In order to improve the output of the armature and to eliminate field oscillations the open armature grooves which are unavoidable in form wound windings are covered by bandages of soft iron flat wire or tape along the entire length of the armature iron. When employing a sheet iron jacket or shell for covering the grooves this shell may be made longer than the armature iron. In order to eliminate eddy currents narrow slits are punched out of the shell. As the voltage drop at the brushes at 6 or 12 volts is very noticeable, a solid brush of pure lead or lead alloy is provided for starting motors.

In the drawing affixed to my specification and forming part thereof a preferred construction of my improved motor is illustrated by way of example. In it:

Fig. 1, shows a starting motor in perspective view,

Fig. 2, is a perspective view of a field magnet element showing associated pole pieces, Fig. 3, illustrates the manner of manufacture of the pole pieces, Fig. 4, illustrates the manner of bandaging the armature with flat wire and Fig. 5, shows an armature fitted with a sheet iron shell.

Fig. 1 shows the armature of a starting motor with the bearing covers 2 and 3 to which the pole pieces 4 are bolted. The bearing covers are preferably provided with an edge or flange (not illustrated) covering the front ends of the pole pieces for closing the bearing cover openings.

Fig. 2 shows a single pole piece. The field coils are located in the corners of the pole pieces and the heads of the field coils are housed in the recesses or grooves indicated by the reference letter A and are preferably produced during the rolling process. The rolling of the pole pieces first takes place in the manner illustrated in Fig. 3. After the rolling of these section irons they are bent into the shape illustrated in Fig. 2. The individual pieces are straightened in a finishing die which offers no difficulties. The abutment upon the bearing covers therefore gives the armature a small very accurate air gap in relation to the pole pieces, which is not influenced by allowances in the dimensions of the pole pieces which may even retain their annealing skin.

Fig. 4 illustrates the bandaging of the armature with flat iron wire or tape.

Fig. 5 shows the application of a sheet iron shell as bandage which is provided with slits S to prevent the development of eddy currents. The lead brushes bring about a reduction in the dimensions of the commutator.

Summing up the improvements described serve the purpose to cheapen the production of light starting and lighting machines of high efficiency. A further advantage is the saving of the storage battery inasmuch as the machines require a considerably smaller current for the necessary output.

What I claim as my invention is:

1. A split pole dynamo electric machine comprising end bearing shields, a plurality of split field magnets extending axially of said machine and secured at their ends to said bearing shields, and field pole pieces on said magnets intermediate said ends.

2. A split pole dynamo electric machine comprising end bearing shields, a plurality of split field magnets having parallel portions extending axially of said machine, an abutment on each end of each of said portions adapted to be secured to said bearing shields, and a field pole piece on each of said portions intermediate said ends.

3. A split pole dynamo electric machine comprising end bearing shields, a plurality of U-shaped split field magnets having parallel portions extending axially of said machine and a yoke portion connecting said parallel portions throughout their length, an abutment on each end of said parallel portions adapted to be secured to said bearing shields, a field pole piece on each of said parallel portions intermediate said ends, and a field coil surrounding each of said lugs and laying flat against said parallel portions.

4. In a split pole dynamo electric machine, a U-shaped field magnet comprising two parallel portions adapted to extend axially of said machine, a yoke portion connecting said parallel portions throughout their length, an abutment on each end of each of said parallel portions, and a field pole piece on each of said parallel portions formed integral therewith and positioned intermediate the ends thereof, said pole pieces, parallel portions and yoke being free from machining.

In testimony whereof I affix my signature.
HERMANN PAPST.